(12) United States Patent
Kunerth et al.

(10) Patent No.: US 7,180,404 B2
(45) Date of Patent: Feb. 20, 2007

(54) WIRELESS SENSOR SYSTEMS AND METHODS, AND METHODS OF MONITORING STRUCTURES

(75) Inventors: Dennis C. Kunerth, Idaho Falls, ID (US); John M. Svoboda, Idaho Falls, ID (US); James T. Johnson, Idaho Falls, ID (US); L. Dean Harding, Chubbuck, ID (US); Kerry M. Klingler, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 351 days.

(21) Appl. No.: 10/803,517

(22) Filed: Mar. 17, 2004

(65) Prior Publication Data

US 2005/0204825 A1 Sep. 22, 2005

(51) Int. Cl.
*G08D 23/00* (2006.01)

(52) U.S. Cl. ............. 340/10.41; 340/505; 340/539.26; 73/786

(58) Field of Classification Search ............. 340/10.1, 340/10.41, 10.34, 572.1, 539.26, 505, 870.17; 73/86, 786
See application file for complete search history.

(56) References Cited

U.S. PATENT DOCUMENTS

| | | | | |
|---|---|---|---|---|
| 4,636,950 A | * | 1/1987 | Caswell et al. ................ 705/28 |
| 4,656,463 A | * | 4/1987 | Anders et al. ............ 340/573.4 |
| 5,053,774 A | | 10/1991 | Schuermann et al. ......... 342/44 |
| 5,440,300 A | * | 8/1995 | Spillman, Jr. ............. 340/10.34 |
| 5,649,035 A | * | 7/1997 | Zimmerman et al. ......... 385/13 |
| 5,745,049 A | * | 4/1998 | Akiyama et al. ....... 340/870.17 |
| 5,792,337 A | * | 8/1998 | Padovani et al. ........ 205/775.5 |
| 5,970,393 A | * | 10/1999 | Khorrami et al. ............ 455/129 |
| 6,240,783 B1 | * | 6/2001 | McGugin et al. ............. 73/594 |
| 6,480,745 B2 | * | 11/2002 | Nelson et al. ................ 907/60 |
| 6,529,127 B2 | | 3/2003 | Townsend et al. .......... 340/505 |
| 6,617,963 B1 | * | 9/2003 | Watters et al. ........... 340/10.41 |
| 6,622,567 B1 | * | 9/2003 | Hamel et al. ................. 73/786 |
| 6,806,808 B1 | * | 10/2004 | Watters et al. ........... 340/10.41 |
| 2004/0078170 A1 | * | 4/2004 | Di Marzio .................. 702/188 |

* cited by examiner

*Primary Examiner*—Edwin C. Holloway, III
(74) *Attorney, Agent, or Firm*—Wells St. John, P.S.

(57) ABSTRACT

A wireless sensor system includes a passive sensor apparatus configured to be embedded within a concrete structure to monitor infiltration of contaminants into the structure. The sensor apparatus includes charging circuitry and a plurality of sensors respectively configured to measure environmental parameters of the structure which include information related to the infiltration of contaminants into the structure. A reader apparatus is communicatively coupled to the sensor apparatus, the reader apparatus being configured to provide power to the charging circuitry during measurements of the environmental parameters by the sensors. The reader apparatus is configured to independently interrogate individual ones of the sensors to obtain information measured by the individual sensors. The reader apparatus is configured to generate an induction field to energize the sensor apparatus. Information measured by the sensor apparatus is transmitted to the reader apparatus via a response signal that is superimposed on a return induction field generated by the sensor apparatus. Methods of monitoring structural integrity of the structure are also provided.

20 Claims, 2 Drawing Sheets

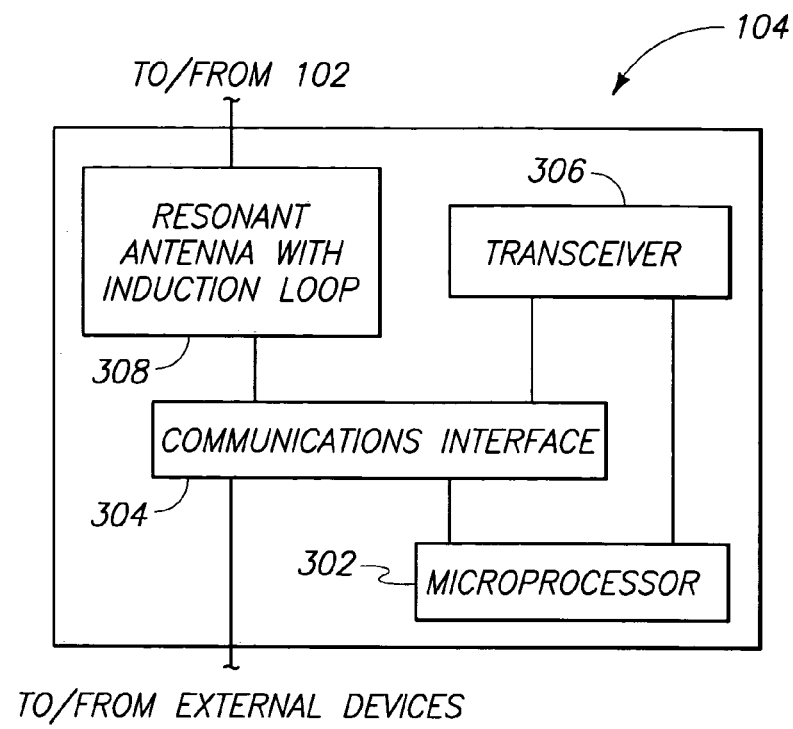
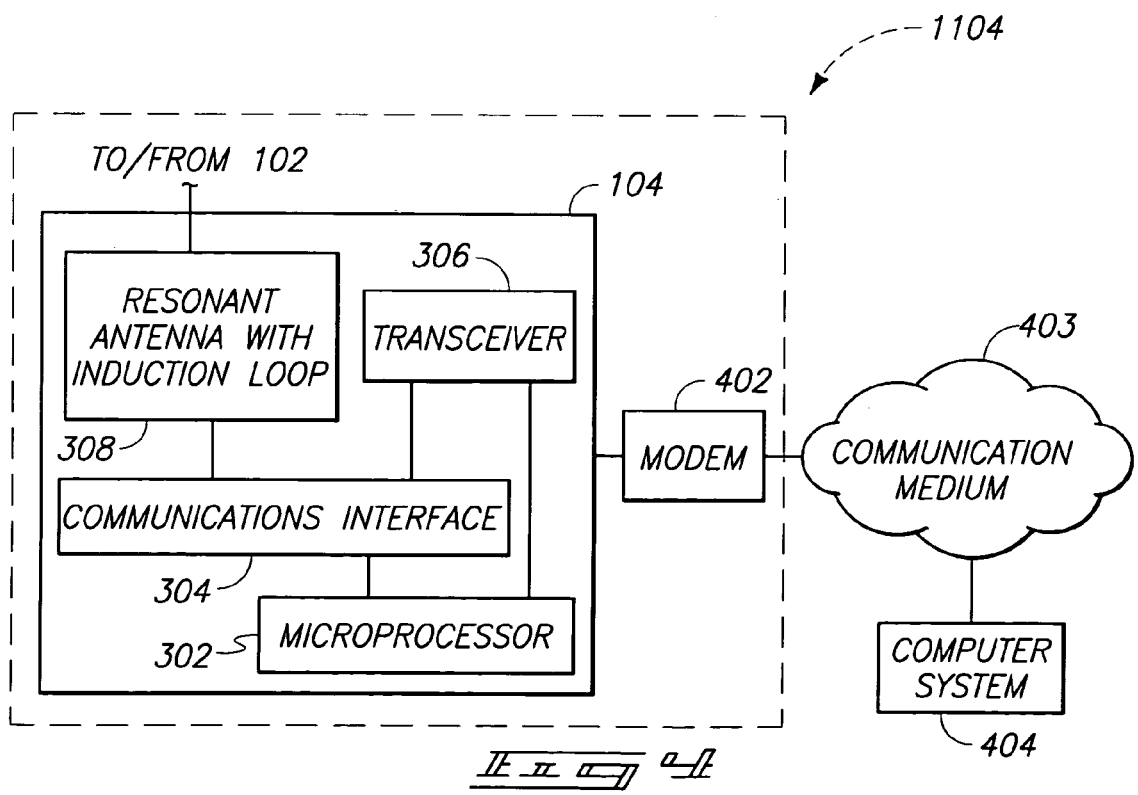

WIRELESS SENSOR SYSTEMS AND METHODS, AND METHODS OF MONITORING STRUCTURES

GOVERNMENT RIGHTS

This invention was made with Government support under Contract No. DE-AC07-99ID13727 between Bechtel BWXT Idaho, LLC and the U.S. Department of Energy. The Government has certain rights in the invention.

TECHNICAL FIELD

Aspects of the invention generally relate to wireless sensor systems and methods, and methods of monitoring bridge structures.

BACKGROUND OF THE INVENTION

Structural integrity of bridges degrades with time due to environmental conditions. Exposure of bridge structures to harmful materials such as salts promotes oxidation of steel components of such structures. Such oxidation may be due to direct exposure of a bridge structure to harmful material such as chlorides in the salts or it may be due to slow infiltration of chlorides into reinforced concrete sections. Chlorides can corrode the reinforcing steel rebar in concrete bridge decks, requiring regular maintenance to ensure the health and safety of bridges. Although the diffusion rate of chlorides may be slow, the resulting corrosion can expand the volume of reinforcing bars (rebars) of the structure and cause the surrounding concrete to crack. Unless preventive maintenance is performed regularly, bridge life spans can be significantly shortened. Detection of corroding rebar in concrete may be difficult, and efforts to remedy such corrosion may be difficult without performing extensive rebuilding of the structure.

Acquiring knowledge as to when and where to perform such maintenance has typically been a costly and time-consuming process. Current methods for analyzing the levels of chlorides in bridge decks involve extracting concrete core samples and analyzing them in a laboratory setting, which is laborious and time consuming. Many tests are required, since it typically takes several years for critical chloride concentration levels to be reached. During bridge inspection, lanes are typically closed, and the bridge is usually sampled only at a few points along the deck. Accordingly, monitoring costs to identify deterioration of bridge structures can be significant.

Thus, it is desirable to develop improved sensor technologies to overcome the above-noted problems.

SUMMARY OF THE INVENTION

Aspects of the invention relate to a sensor apparatus for periodic monitoring/sensing of environmental variables such as, for example, moisture, temperature, pressure, contamination, or radiation. In some embodiments, sensor apparatus is inactive until energized by a reader apparatus configured to provide power to the sensor apparatus. The sensor apparatus communicates with the reader apparatus via short-range telemetry. A short range induction field generated by the reader apparatus powers the sensor apparatus and carries information therefrom via a response signal that is superimposed on an induction field generated by the sensor apparatus.

More particularly, aspects of the invention relate to wireless sensor systems and methods, and method of monitoring bridge structures.

In some embodiments, a wireless sensor system includes a reader apparatus configured to generate an induction field, a sensor apparatus configured to monitor structural integrity of an object. The sensor apparatus is communicatively linked to the reader apparatus and is in a passive state until energized by the reader apparatus. The sensor apparatus includes processing circuitry, a resonant antenna configured to communicate data between the sensor apparatus and the reader apparatus, the resonant antenna being configured to collect energy from the induction field in order to energize the sensor apparatus. The sensor apparatus also includes a plurality of sensors configured to measure predetermined parameters of the object, and to be independently interrogated by the reader apparatus. Measurements obtained by the individual sensors are transmitted via a response signal in a return field to the reader apparatus via the resonant antenna. The response signal is superimposed on an induction field generated by the sensor apparatus. The sensor apparatus also includes charging circuitry configured to store energy collected from the induction field to provide power to the sensor apparatus. The charging circuitry is configured to accumulate energy while measurements are being made by the plurality of sensors. The reader apparatus includes a transceiver configured to communicate with the sensor apparatus, an antenna having an induction loop, a communications interface coupled to the antenna, and a microprocessor configured to control operations of the reader apparatus. The reader apparatus is configured as a user-interface to the sensor apparatus wherein the individual sensors of the sensor apparatus are independently interrogated by the microprocessor.

In other embodiments, a wireless sensor system includes a passive sensor apparatus configured to be embedded within a concrete structure to monitor infiltration of contaminants into the structure. The sensor apparatus includes charging circuitry and a plurality of sensors respectively configured to measure environmental parameters of the structure which include information related to the infiltration of contaminants into the structure. A reader apparatus is communicatively coupled to the sensor apparatus, the reader apparatus being configured to provide power to the charging circuitry during communications with the sensor apparatus. The reader apparatus is configured to independently interrogate individual ones of the sensors to obtain information measured by the individual sensors. The reader apparatus is configured to generate an induction field to energize the sensor apparatus, and information measured by the sensor apparatus is transmitted to the reader apparatus via a response signal that is superimposed on a return induction field generated by the sensor apparatus.

In yet other embodiments, a method of monitoring structural integrity of a bridge structure is described. The method includes embedding a passive sensor apparatus within the bridge structure, communicatively coupling a reader apparatus, disposed external of the bridge structure, to the sensor apparatus to enable data communication therebetween, configuring the reader apparatus to communicate with the sensor apparatus via short range telemetry communication, and energizing the sensor apparatus via an induction field generated by the reader apparatus. The sensor apparatus is in an inactive state until energized by the reader apparatus, wherein the energizing includes storing energy generated by the induction field in a charging circuitry of the sensor apparatus. The charging circuitry is configured to accumulate energy after the sensor apparatus reverts to an inactive state from an active state, and accumulate energy during measurement periods by the individual sensors. The method also includes performing measurements by the sensor apparatus after receiving an indication from the reader apparatus, or upon receiving an indication from a processing circuitry of the sensor apparatus that the charging circuitry is sufficiently charged to perform the measurements, and transmitting the measurements to the reader apparatus. The sensor apparatus is configured to generate an induction field and wherein the measurements made by the sensor apparatus are transmitted in a response signal that is superimposed on the induction field generated by the sensor apparatus.

In further embodiments, a method of monitoring structural integrity of a structure is described. The method includes embedding a passive wireless sensor platform apparatus within the structure to monitor infiltration of contaminant materials into the structure, communicatively coupling a reader apparatus to the sensor apparatus, configuring the reader apparatus to communicate with the sensor apparatus via short range telemetry communication, and energizing the sensor apparatus via an induction field generated by the reader apparatus, wherein the sensor apparatus is in a passive state until energized by the reader apparatus. The method also includes monitoring the infiltration and obtaining corresponding measurements upon receiving an indication for the monitoring from one of the reader apparatus, or a processing circuitry of the sensor apparatus, and transmitting the measurements to the reader apparatus in a response signal from the sensor apparatus, the response signal being superimposed on an induction field generated by the sensor apparatus.

BRIEF DESCRIPTION OF THE DRAWINGS

Preferred embodiments of the invention are described below with reference to the following accompanying drawings.

FIG. 3 is a block diagram of the reader apparatus shown in FIG. 1 in accordance with some embodiments.

FIG. 4 is a block diagram schematic of the reader apparatus shown in FIG. 1 in accordance with some embodiments.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
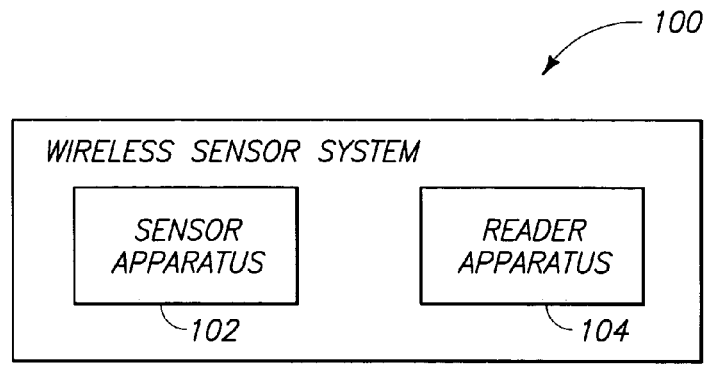
FIG. 1 is a high-level block diagram of a wireless sensor system in accordance with some embodiments.

Referring to FIG. 1 a high-level block diagram of a wireless sensor system arranged according to some embodiments is shown. The depicted sensor system 100 includes a sensor apparatus 102 and a reader apparatus 104. The sensor apparatus 102 may be alternatively referred to herein as a sensor platform, and the reader apparatus 104 may be alternatively referred to herein as a data logger.

In one embodiment, the sensor apparatus 102 may be disposed or embedded in a test environment, such as for example, a concrete structure (e.g., a bridge), to monitor the structural integrity of the structure. For example, the sensor apparatus 102 may be used to detect the infiltration of chlorides or other harmful materials affecting the structural integrity of the structure. If such harmful materials are detected prior to their arrival at reinforcing bars (rebar) of the concrete structure, then the affected concrete structure may be removed and the structure may be rebuilt without involving significant expense and effort, thereby extending the lifespan of the structure and reducing maintenance costs.

Figure 2:
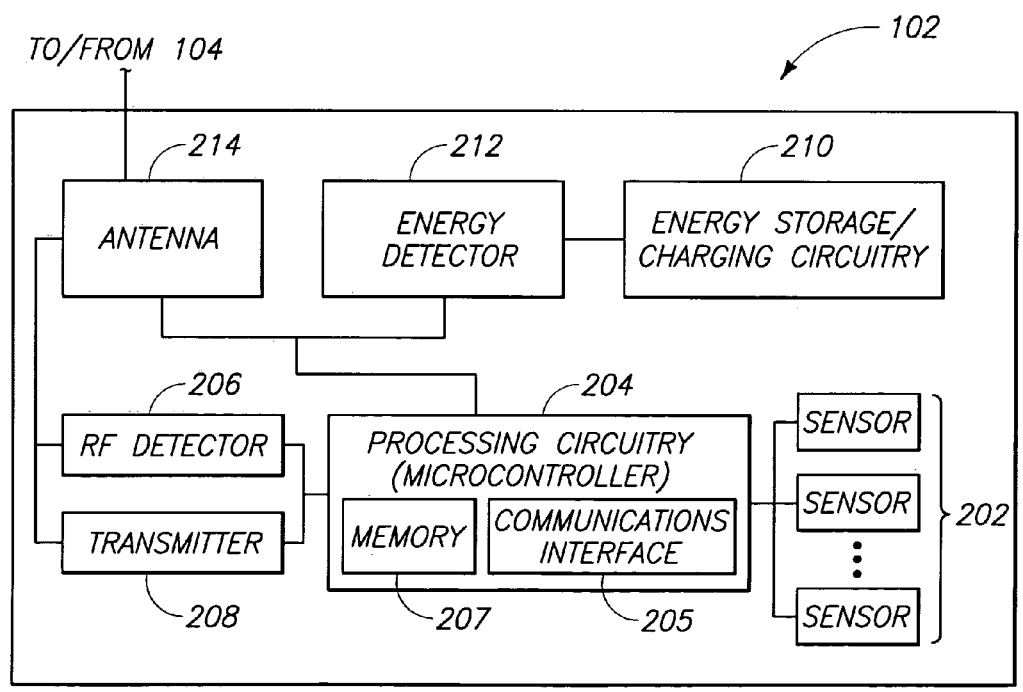
FIG. 2 is a detailed block diagram of sensor apparatus in accordance with some embodiments.

In one exemplary embodiment, the sensor apparatus 102 is configured to be passive (e.g., inactive state or inactive mode) until it is energized by the reader apparatus 104. For purposes of this application, "passive" is defined as "not having an on-board power source." Further details of the sensor apparatus 102 are described below with reference to the embodiment as shown in FIG. 2.

The reader apparatus 104, generally referred henceforth as reader 104, is configured to communicate with and interrogate the sensor apparatus 102 in order to retrieve information (e.g., information related to a structure within which the sensor apparatus is provided, information related to structural integrity of the concrete structure) gathered by the sensor apparatus 102. The reader 104 performs as a user-interface to sensor apparatus 102 and it may be fixed in a spaced relationship with sensor apparatus 102, or configured to be mobile (e.g., carried by a user or mounted on a vehicle) to enable on-the-fly measurements. In one example, reader 104 communicates with sensor apparatus 102 via short range telemetry, thereby eliminating a need for physical wires to establish communication between the sensor apparatus 102 and the reader 104. For example, short range telemetry communication may be performed in the frequency range of about 125 kHz to about 134 kHz. Other frequencies could be used.

Functionally, sensor apparatus 102 is activated and powered by the reader 104. Once activated, sensor apparatus 102 obtains measurements of the structure within which it is embedded and responds back to the reader 104 with the measurements. Induction field (e.g., return induction field) generated by the sensor apparatus 102 is configured to carry measurements made by the sensor apparatus 102 to the reader 104. In one embodiment, the measurements are sent via a response signal that is superimposed on the return induction field generated by the sensor apparatus 102. Reader 104 is configured to detect an output of the sensor apparatus 102 via a radio frequency (RF) signal generated by the sensor apparatus 102.

Although the wireless sensor system 100 of FIG. 1 is shown to be include only one sensor apparatus 102 for purposes of simplicity, it will be appreciated that a plurality of such sensor apparatuses are possible. Further, individual ones of such sensor apparatuses may be independently interrogated by the reader. Also, a remote interrogation device (e.g., remote computer) may be used to remotely interrogate such sensor apparatuses.

Further details of the reader 104 are set forth below with reference to the embodiment as shown in FIG. 4.

Referring to FIG. 2, a detailed block diagram of sensor apparatus 102 in accordance with some embodiments is shown. The sensor apparatus 102 includes one or more sensors 202, a processor or processing circuitry 204, an RF detector 206, a transmitter 208, an energy storage or charging circuitry 210, an energy detector 212, and an antenna 214.

The sensor apparatus 102 is inactive until energized by a remote power source (e.g., reader 104). After being activated, the sensor apparatus 102 polls onboard sensors 202 that are configured to obtain measurements of the environment (e.g., concrete structure, bridge structure, etc.) where such sensors are disposed and communicate with reader 104 with sensor measurements.

In operation, according to one embodiment, in order to obtain sensor measurements, reader 104 transmits energy in the form of an alternating magnetic field, which is captured and stored in charging circuitry 210 of the sensor apparatus 102. The captured energy energizes the processing circuitry 202 configured to provide instructions to the one or more sensors 204 to perform measurements. Such measurements (e.g., moisture content, temperature, pressure, determination of contaminants such as chlorides, etc.) are then digitized. After such measurements are made and digitized, processing circuitry 202 provides power to transmitter 208 of sensor apparatus 102 and controls modulation such as frequency shift keying (FSK) to impress the respective digitalized measurements on the transmitted waveform, which may be subsequently decoded by reader 104. After the measurements are transmitted to the reader 104, the sensor apparatus 102 reverts back to inactive or sleep state and accumulates energy to perform a subsequent cycle of measurements.

In another embodiment, reader 104 may be configured to not only provide energy in the form of an alternating magnetic field but also provide instructions to sensor apparatus 102. For example, sensor apparatus 102 may be instructed to report measurements made by a particular sensor among sensors 202 or to adjust the operating range of such sensor.

Sensors 202 are configured to sense environmental variables such as, for example, moisture, temperature, pressure, contamination, or radiation. As noted above, contaminants in a concrete structure may include chlorides and salts that cause structural degradation of the bridge structure. Individual ones of the sensors 202 may be configured to sense distinct environmental variables. For example, one set of sensors may be configured to sense temperature while another set of sensors may be configured to sense pressure, etc. Thus, in one embodiment, sensor apparatus 102 may include an assortment of sensors 202 individually configured to sense a variety of environmental variables. Accordingly, individual ones of the sensors 202 may be interrogated by reader 104 to read measurements.

The processing circuitry 204 is configured to control various functions performed by the sensor apparatus 102 including controlling various components (e.g., 206–214) comprised in the sensor apparatus 102. Further, processing circuitry 204 is configured to change status of sensor apparatus 102 from an inactive state (e.g., sleep mode) to an active state (e.g., wakeup mode) in order to perform a series of preprogrammed steps to determine (a) if a measurement is being requested by reader 104, (b) acquire readings or measurements from one or more sensors 202 if instructed to do so by either reader 104 or processor 204, and (c) transmit the acquired readings or measurements to the reader 104. While various alternatives are possible in some embodiments, the processor 204 is a Programmable Interface Controller PIC16F876-04/SP by Microchip Technology, Inc. which includes onboard non-volatile memory (e.g., 207), multiple analog-to-digital (A/D) converter channels, and digital communication ports (e.g., communication interface 205). As noted above, the processing circuitry 204 is configured to control the logic necessary for power management (e.g., charging circuitry 210), operation of one or more sensors 202, and communication with reader 104.

The processing circuitry 204 may be configured to process instructions received from reader 104 and measurements received from sensors 202. The processing circuitry 204 may comprise circuitry configured to execute programming. In an exemplary embodiment, as noted above, processing circuitry 204 may be implemented as a microprocessor or other structure configured to execute executable applications of programming including, for example, software and/or firmware instructions. Other exemplary embodiments of processing circuitry 204 include hardware logic, PGA, FPGA, ASIC, and/or other structures. These examples of processing circuitry 204 are for illustration and other configurations are possible for implementing operations discussed herein.

In one example, processing circuitry 204 may be configured to include instructions or executable applications responsive to a request from reader 104. Exemplary commands or executable applications received by processing circuitry 204 can include, for example, commands, control functions to store energy in charging circuitry 210, providing power to the sensors 202 to perform measurements, processing of measurements made by the sensors 202, and transmission of the measurements to the reader 104.

Communications interface 205 provided in processing circuitry 204 may be configured to communicate electronic data externally of sensor apparatus 102. For example, communications interface 205 enables communication with respect to reader 104 via antenna 214. In one embodiment, communications interface 205 may be arranged to provide input/output communications with respect to one or more sensors 202 and reader 104. The communications interface 205 may comprise a serial port, a parallel port, USB port, EIO slot, network interface card, wireless architecture, or other appropriate configuration capable of communicating electronic data.

The RF detector 206 is configured to determine if the reader 104 is transmitting an energy field to the sensor apparatus 102.

The processing circuitry 204 includes a memory 207 configured to store measurements made by sensors 202. In one exemplary case, the memory 207 may be configured to store electronic data (e.g., electronic or digital sensor measurements), file systems having one or more electronic files, programming such as executable instructions (e.g., software and/or firmware), and/or other digital information and may include processor-usable media. Sensor measurements may be loaded into the memory 207 after such measurements are made by the sensors 202. As noted above, such measurements may be made by the sensors 202 in response to receiving instructions from the processing circuitry 204 or from the reader 104 (FIG. 1).

Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, and infrared or semiconductor media. Some more specific examples of processor-usable media include, but are not limited to, random access memory, read only memory, flash memory, cache memory, and/or other configurations capable of storing programming, data, or other digital information.

The transmitter 208 is configured to transmit measurements made by the sensors 202 to the reader 104 via the antenna 214.

The energy storage circuitry or charging circuitry 210 is configured to store energy generated by an alternating electromagnetic induction field of the reader 104. The charging circuitry 210 may include a plurality of energy storage capacitor banks or sets. Individual capacitor banks include one or more energy storing capacitors. Individual capacitor banks are designed to provide power for predetermined operations of the sensor apparatus 102. For example, a first capacitor bank may be designed to provide power to run the basic operations or short-term operations of the sensor apparatus 102 that may include providing power to sensors designed to consume low power, while a second capacitor bank may be designed to provide power for extended operations (e.g., collect data for a number of hours or days) of the sensor apparatus 102 without resorting to extracting power from the reader 104. The processing circuitry 204 is configured to control charging and usage of the various capacitor banks of the charging circuitry 210.

In one embodiment, energy generated by the alternating magnetic field of the reader 104 is stored in the capacitor banks of the charging circuitry 210, and measurements by the sensors 202 are initiated by the processing circuitry 204 after a predetermined charge, as measured by the energy detector 212, has been stored in the charging circuitry 210. Accordingly, in this exemplary embodiment, energy is stored in the charging circuitry 210 at a first time period and measurements by the sensors 202 is performed at a later time period after the charging circuitry 210 has been energized with a predetermined level of charge.

However, in another embodiment, charging circuitry 210 may be energized by the reader 104 while measurements are being made by sensors 202 even when the charging circuitry 210 is not energized to the predetermined charge level. Accordingly, there is no delay to perform measurements by the sensors 202.

The energy detector 212, as noted above, provides an indication of the amount of charge stored in the charging circuitry 210. The processing circuitry 204 is configured to poll the energy detector 212 to determine if the charging circuitry 210 is energized to a predetermined level. The processing circuitry 204 after determining such energized state of the charging circuitry 210 as indicated by the energy detector 212 polls the RF detector 206 to determine if reader 104 (FIG. 1) is still transmitting the electromagnetic energizing field. If not, the processing circuitry 204 determines that the reader 104 is not tuned to the sensor apparatus 102, and the processing circuitry 204 interrogates the one or more sensors 202 to initiate measurements by the sensors 202.

Antenna 214 includes a resonant circuit configured for capturing electromagnetic energy (e.g., generated from an induction field) from reader 104 as well as transmitting measurements made by sensors 202 to reader 104. As noted above, once sensors 202 are interrogated by processing circuitry 204, measurements made by sensors 202 are obtained and digitized by the processing circuitry 204. Such measurements are stored in memory 207 of the processing circuitry 204. The processing circuitry 204 then provides power to transmitter 208 which in turn drives the antenna 214 to transmit the measurements to the reader 104.

Digitalization of measurements includes performing frequency-shift keying which is accomplished by switching a small capacitance in and out of a resonant circuit of the antenna 214, and controlling the switching by the processing circuitry 204.

FIG. 3 is a block diagram of the reader shown in FIG. 1 in accordance with some embodiments of the invention. The reader 104 includes a microprocessor 302, a communications interface 304, a transceiver 306, and a resonant antenna 308.

The microprocessor 302 is configured to control various operations of the reader 104 including activating sensor apparatus 104. In one embodiment, the microprocessor 302 may be configured to provide instructions to the sensor apparatus 102 to interrogate the sensors 202 as well as energy to the sensor apparatus 102, such energy being provided by way of electromagnetic induction field generated by the reader 104. For example, the sensor apparatus 102 may be instructed by the microprocessor 302 to report a measurement made by a specific sensor among a plurality of sensors provided in the sensor apparatus 102, or to adjust the operating range of such sensor. Other than providing instructions that are specific to the reader 104, architectural configuration of microprocessor 302 may be similar to processing circuitry 204 as shown in FIG. 2, and accordingly such details of processing circuitry 204 which were described above with reference to FIG. 2 will not be repeated.

The communications interface 304 may be configured to communicate electronic data externally of the reader 104 as well as routing data within the reader 104. For example, the communications interface 304 enables communication with respect to the sensor apparatus 104 via the antenna 308. In one embodiment, the communications interface 302 may be arranged to communicate instructions to interrogate the sensors 202 or adjust an operating range of such sensors. The communications interface 302 may comprise a parallel port, USB port, EIO slot, network interface card, and/or other appropriate configuration capable of communicating electronic data.

The transceiver 306 is configured to transmit and receive data to/from external devices (e.g., sensor apparatus 102, sensors 202, an external computer as shown in FIG. 4). For example, the transceiver 306 may be configured to receive measurement information from the transmitter 208 (FIG. 2) as well as transmit interrogation signals to the sensors 202 of the sensor apparatus 102 to perform measurements.

The resonant antenna 308 includes a resonant circuit (not shown). Information directed to and received from the transceiver 306 passes via the antenna 308. In one case, the antenna 308 uses large diameter, frequency tuned loops having multi-strand wire. For example, in some embodiments, the antenna has a diameter above 66 inches. Such provides several square feet of coverage for multiple sensor apparatuses or platforms, such as, for example, the sensor apparatus 102 (FIG. 1). Due to the multi-strand wire in the antenna loop, high current/high amplitude magnetic fields may be generated providing an extended working range.

Efficiency of the antenna 308 may be increased by modifying antenna design to increase the cross-sectional area cut by the induction field, thereby improving energy transfer. A drift from desired resonant frequency by either the sensor apparatus 102 or the reader 104 detunes circuitry of the antenna 308. Efficiency of the antenna 308 may also be increased by minimizing resonant frequency drift due to varying environmental conditions. The resonant drift frequency may be detected and corrected to modify antenna characteristics to regain the desired resonant frequency. Also, the antenna 308 is configured such that the antenna's resonant frequency may be varied to match the frequency of an object or structure in which the sensor apparatus 102 is embedded.

In one exemplary case, resonant circuit of the antenna 214 of the sensor apparatus 102 includes wire wrapped inductors on long ferrite rods having dimensions of $\frac{1}{2} \times 7$ inch. Such dimensions provided efficient collection of energy at extended ranges, and transmission of measurements, obtained by the sensors 202 to the reader 104.

FIG. 4 is a block diagram schematic of a reader apparatus 1104 in accordance with another embodiment wherein elements like those illustrated in FIG. 3 are identified using like reference numerals. In this embodiment, the reader 1104 is communicatively coupled to a modem 402 which is configured to send and receive information to/from a remote device 404 (e.g., computer system) external of reader apparatus 1104 via a communication medium (e.g., wired or wireless). For example, sensor data or information measured by the sensors 202 and received by the reader 1104 may be configured for further transmission to the remote device 404. Information from the remote device 404 may be sent to the reader 104 via the modem 402, and such information may include instructions to the sensor apparatus 102 (FIG. 1) or to the sensors 202 (FIG. 2) to initiate measurements by the sensors 202. In one exemplary case, to forward measurements from the reader 104 to the remote device 404, the transceiver 306 (FIG. 3) is tuned such that its passband is centered on one of the frequency components of a modulated wave. Such produces, for example, an analog output from the transceiver 306. In the illustrated embodiment, the output is level shifted to become a serial signal (e.g., RS-232 signal) which is captured by a serial port of the remote device 404, which may function as a data logger.

Using the embodiment of FIG. 4, a user may provide the reader 104 in operational proximity to the sensor apparatus 102. In one exemplary case, the maximum separation between the sensor apparatus 102 and reader 104 is determined by a level at which a charging voltage (e.g., to charge the sensor apparatus 102 by the reader 104) is less than the voltage stored in charging circuitry 210. In another case, sensor apparatus 102 and reader 104 may be separated by no more than about 2 meters. Accordingly, advantages of the embodiment of FIG. 4 include obtaining measurements made by sensors 202 from a remote location. Thus, a user need not physically carry reader 104 to obtain measurements made by sensors 202.

Aspects of the invention provide various advantages, which in some embodiments include, (a) no wires to impede measurements, (b) sensor apparatus can be robust and small, (c) data acquisition can be remote and automated, (d) multiple sensors may be incorporated into a single sensor apparatus, and multiple sensor apparatuses may be interrogated by a single reader apparatus.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A wireless sensor system, comprising:
    a reader apparatus configured to generate an induction field;
    a sensor apparatus configured to monitor structural integrity of an object, the sensor apparatus being communicatively linked to the reader apparatus and in a passive state until energized by the reader apparatus, the sensor apparatus including:
        processing circuitry;
        a resonant antenna configured to communicate data between the sensor apparatus and the reader apparatus, the resonant antenna being configured to collect energy from the induction field to energize the sensor apparatus;
        a plurality of sensors, the sensors being respectively configured to measure predetermined parameters of the object, and to be independently interrogated by the reader apparatus, measurements obtained by the individual sensors being transmitted via a response signal to the reader apparatus via the resonant antenna, the response signal being superimposed on the return induction field;
        circuitry configured to store energy collected from the induction field to provide power to the sensor apparatus, including two capacitor banks, one of the capacitor banks being configured to provide power for short-term operations and the other of the capacitor banks being configured to provide power for extended operations, and being configured to accumulate energy while measurements are being made by the plurality of sensors; and
    the reader apparatus including:
        a transceiver configured to communicate with the sensor apparatus;
        an antenna having a loop with a diameter above 66 inches, the loop being formed of multi-strand wires;
        a modem configured to selectively transfer data from the reader apparatus to a remote site;
        a microprocessor configured to control operations of the reader apparatus, and the individual sensors of the sensor apparatus being independently interrogated by the microprocessor, in operation.

2. The system of claim 1, wherein the reader apparatus is stationary.

3. The system of claim 1, wherein the reader apparatus is mobile.

4. The system of claim 1, wherein upon storing predetermined energy in the energy storing circuitry, the processing circuitry of the sensor apparatus is configured to activate the sensor apparatus from a sleep state to an active state to perform a series of preprogrammed measurement steps to determine the structural integrity of the object, and wherein the antenna of the reader apparatus is configured to be tuned in order to match the resonant frequency of the antenna with a frequency of the object embedding the sensor apparatus.

5. The system of claim 4, wherein upon activation, individual ones of the sensors are polled to provide a response to the reader apparatus with measurement data obtained by the respective individual sensors.

6. The system of claim 4, wherein the sensor apparatus reverts back to the sleep state upon transmitting data obtained during the measurement steps.

7. The system of claim 6, wherein upon reverting back to the sleep state, the energy storing circuitry of the sensor apparatus is configured to accumulate energy to perform a subsequent cycle of measurements.

8. The system of claim 1, wherein the sensor apparatus communicates via short range telemetry in the frequency range of about 125 kHz to 134 kHz.

9. The system of claim 1, wherein the energy storing circuitry comprises at least two capacitor banks, the capacitor banks including the capacitors.

10. A wireless sensor system, comprising:
    a passive sensor apparatus configured to be embedded within a concrete structure to monitor infiltration of contaminants into the structure, the sensor apparatus including energy storing circuitry having two capacitor banks, one of the capacitor banks being configured to provide power for short-term operations and the other of the capacitor banks being configured to provide power for extended operations, and the sensor apparatus further including a plurality of sensors respectively configured to measure environmental parameters of the structure including information related to the infiltration of contaminants into the structure; and a reader apparatus communicatively coupled to the sensor apparatus, the reader apparatus being configured to provide power to the energy storing circuitry during communications with the sensor apparatus, the reader apparatus being configured to independently interrogate individual ones of the sensors to obtain information measured by the individual sensors, and the reader apparatus being configured to generate an induction field to energize the sensor apparatus, and information measured by the sensor apparatus is transmitted to the reader apparatus via a response signal.

11. The system of claim 10, the sensor apparatus comprising:

processing circuitry; and a resonant antenna having tuning circuitry configured to communicate data between the sensor apparatus and the reader apparatus, the energy storing circuitry being configured to store energy generated by the induction field, and the sensor apparatus being configured to be in an inactive state until energized by the induction field of the reader apparatus, and data obtained by the individual sensors being transmitted in the return induction field to the reader apparatus via the resonant antenna.

12. The system of claim 11, the reader apparatus comprising:

a transceiver configured to communicate with the sensor apparatus;

an antenna having an induction loop;

a communications interface configured to communicate information from a remote user to the reader apparatus; and a microprocessor configured to control operations of the reader apparatus, wherein the reader is configured as a user-interface to the sensor apparatus.

13. The system of claim 11, wherein the antenna of the reader apparatus is configured to be tuned in order to match the resonant frequency of the antenna with a frequency of the object embedding the sensor apparatus.

14. The system of claim 10, wherein the processing circuitry is configured to control operations of the plurality of capacitor banks.

15. The system of claim 13, wherein upon storing predetermined energy in the energy storing circuitry, the processing circuitry is configured to switch the sensor apparatus from the inactive state to an active state to perform a series of preprogrammed measurement steps to determine structural integrity of the concrete structure.

16. The system of claim 15, wherein the sensor apparatus is configured to revert to the inactive state upon transmitting data that is obtained during the measurement steps to the reader apparatus.

17. The system of claim 16, wherein upon reverting back to the inactive state, the energy storing circuitry of the sensor apparatus is configured to accumulate energy for a subsequent cycle of operation of the sensor apparatus.

18. The system of claim 16, wherein the energy storing circuitry of the sensor apparatus is configured to accumulate energy at least while measurements are made by the sensors.

19. The system of claim 10, wherein the sensor apparatus communicates with the reader apparatus via short range telemetry in the frequency range of about 125 kHz to 134 kHz.

20. The system of claim 10, wherein upon activation by the reader apparatus, the sensor apparatus is configured to poll the sensors and provide a response to the reader apparatus with information measured by the sensors via the response signal.

* * * * *